P. FRANTZ.
CAR DOOR CONSTRUCTION.
APPLICATION FILED MAR. 1, 1915.
1,228,013.
Patented May 29, 1917.
2 SHEETS—SHEET 1.
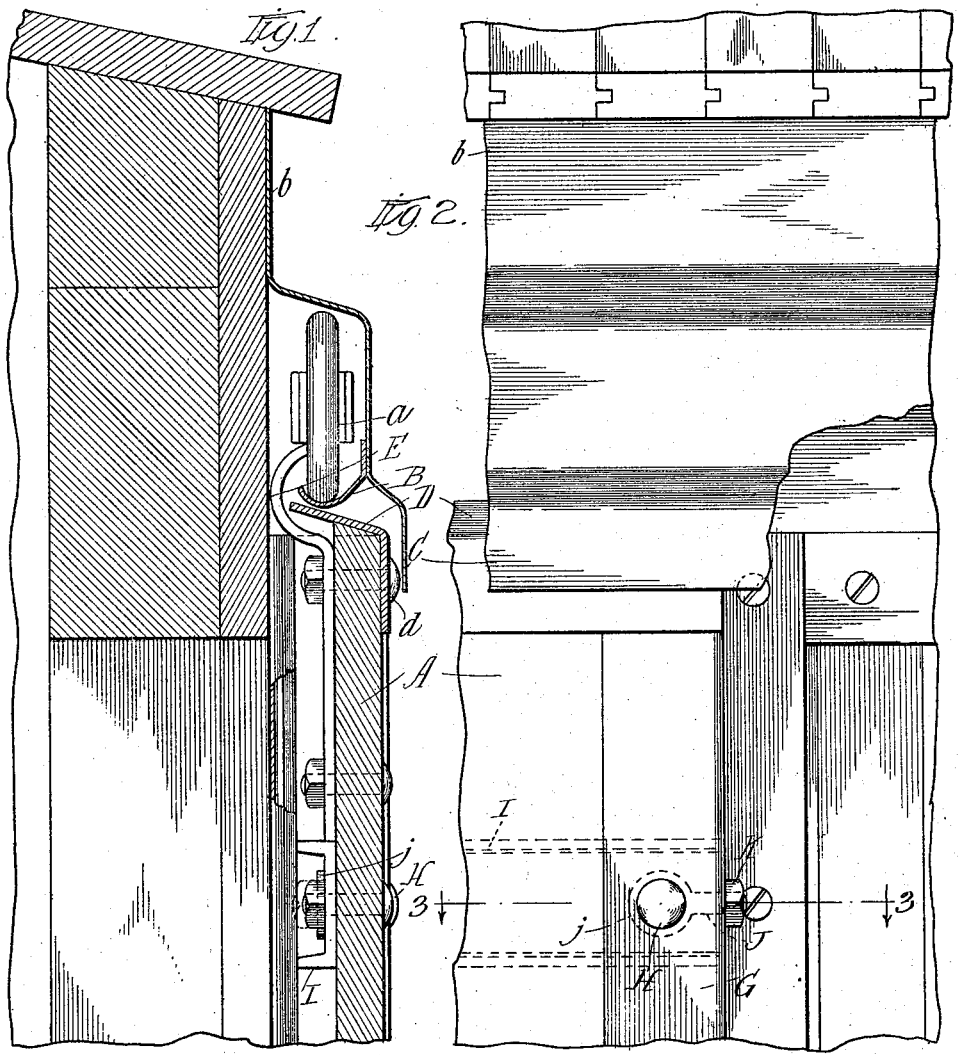
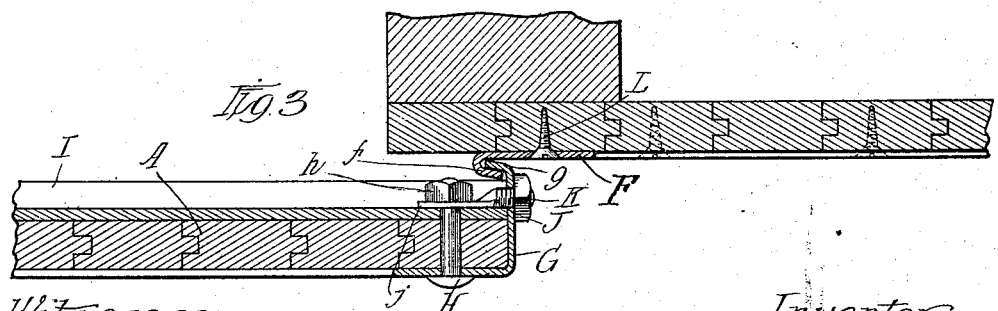

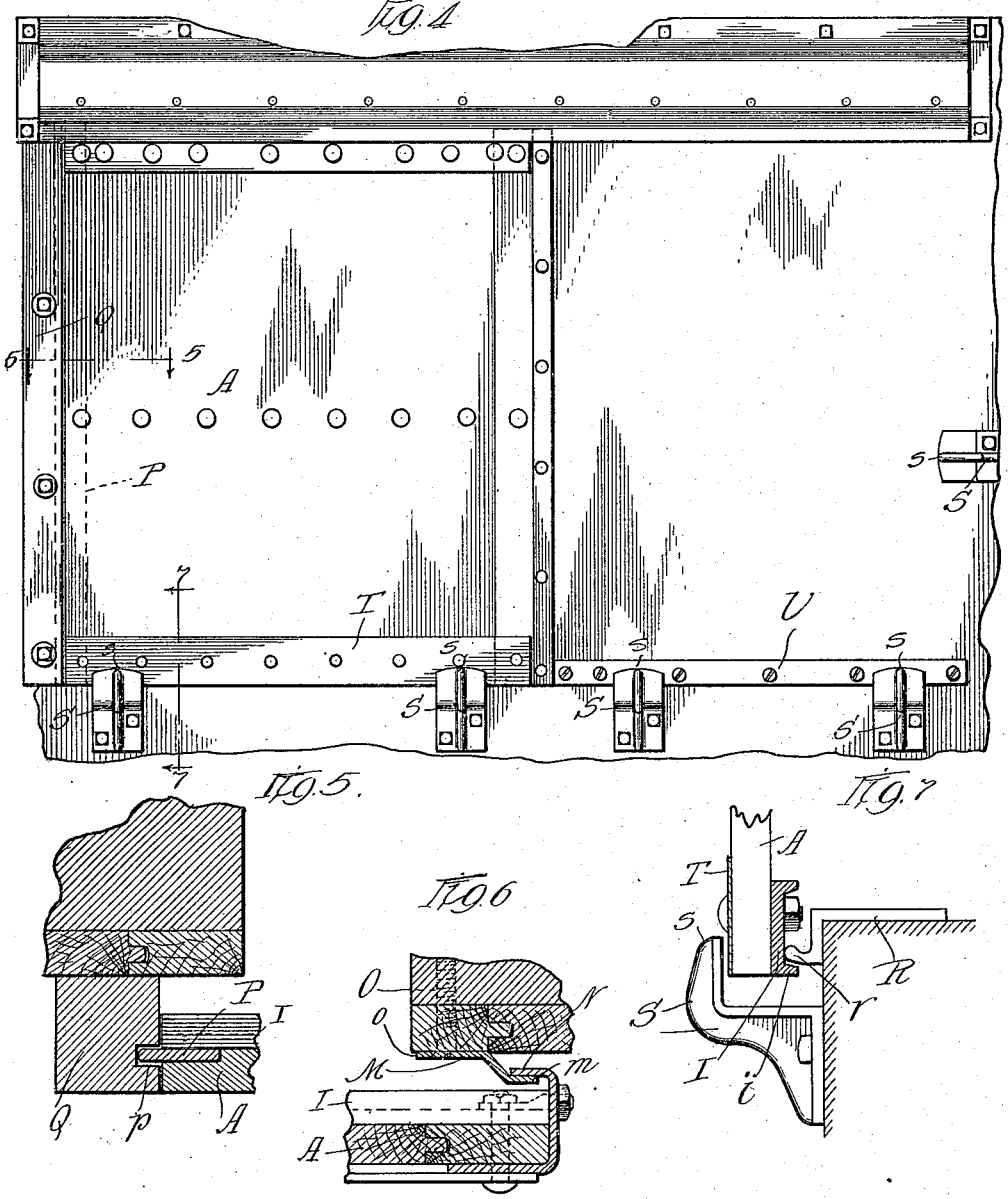

UNITED STATES PATENT OFFICE.

PETER FRANTZ, OF STERLING, ILLINOIS, ASSIGNOR TO FRANTZ MANUFACTURING CO., OF STERLING, ILLINOIS, A CORPORATION OF ILLINOIS.

CAR-DOOR CONSTRUCTION.

1,228,013.  Specification of Letters Patent.  Patented May 29, 1917.

Application filed March 1, 1915. Serial No. 11,152.

*To all whom it may concern:*

Be it known that I, PETER FRANTZ, a citizen of the United States of America, and resident of 309 Ninth avenue, Sterling, Whiteside county, Illinois, have invented a certain new and useful Improvement in Car-Door Constructions, of which the following is a specification.

My invention relates to doors for cars, and more especially to freight car doors of the kind which slide back and forth on the side of the car, doors of this kind being very commonly and extensively used on box cars, and one objection being that doors of this kind are not usually weather tight.

Generally stated, the object of my invention is to provide a novel construction and arrangement for making a car door of this kind practically weather tight, and more especially to provide means for effectively closing the crack or slight space which is ordinarily found at the rear edge of the door, when the latter is closed, and which if not tightly closed will allow wind and rain and snow, and also dust and dirt, to enter the car while the same is in service.

It is also an object to provide certain details and features of construction and combinations tending to increase the general efficiency and desirability of a weather tight car door of this particular character.

To the foregoing and other useful ends my invention consists in matters hereinafter set forth and claimed.

In the accompanying drawings—

Figure 1 is a vertical section of the upper portion of a car door construction embodying the principles of my invention.

Fig. 2 is a side elevation of the structure shown in Fig. 1.

Fig. 3 is a horizontal section on line 3—3 in Fig. 2.

Fig. 4 is a side elevation of a car door and the adjacent portions of the car body, showing the guide brackets for the lower edge of the door.

Fig. 5 is an enlarged section on a horizontal line 5—5 in Fig. 4.

Fig. 6 is a view similar to Fig. 3, showing a different form of my invention.

Fig. 7 is an enlarged section on line 7—7 in Fig. 4.

As thus illustrated, the car door A is provided with hangers having wheels *a* which travel on the track B, the latter being secured to the upper portion of the side of the car at *b*, said track providing a housing and being made of sheet metal. The flange C hangs down immediately outside of the upper edge of the door to shed the rain and make the upper edge of the door weather tight. For this purpose the inclined flange D is secured to the upper edge of the door, preferably by bolts *d*, and is adapted to slide on the lower surface of the track B, or to move along very close thereto, as shown in Fig. 1. It will be understood that the hangers having wheels *a* may be of any suitable character, but they are preferably provided with gooseneck portions E which extend around the inner edges of the track B and the flange D, thereby supporting the door in a vertical plane a little outside of the vertical plane of said wheels. Any suitable or desired number of these wheels may be employed.

As shown in Fig. 3, the outer side of the car is provided with a vertically disposed sheet metal weather strip F having its inner edge bent outward and backward to form the portion *f* which is, in horizontal section, or when viewed from above, hook-shaped in character or form. A sheet metal weather strip G extends up and down the rear edge of the door A, this strip being in the form of an angle iron when viewed from above, and the outer flange of this strip being clamped to the outer surface of the door by bolts H extending through the door and through the channel bars I secured to the inner surface of the door. The inner edge of the weather strip G is bent around to provide a narrow flange *g* which enters the throat of the hook-shaped portion *f* of the engaging or coöperating strip F on the side of the car. Eye-bolts J extend through the strip G and have eyes $j$ which encircle the bolts H, the latter having nuts $h$ which clamp the said eyes in the channels of the bars I which extend across the inner surface of the door. The nuts K on the outer ends of said eye-bolts are preferably of such size that they practically form a backing for the engaging portion $g$ of the weather strip on the door, whereby this portion $g$ is firmly held in the throat or groove of the weather strip F when the door is closed. In other words, the door can be closed tightly and forcibly, and at such time the thrust or pressure on the portion $g$ is resisted by the nuts K, thereby preventing distortion of the sheet metal weather strip on the door. Screws L are employed for securing the weather strip F flatwise upon the outer surface of the side of the car body, but other suitable means can be employed for this purpose.

In Fig. 6 the construction is substantially the same as that shown in Fig. 3, but in this case the weather strip M is of a different shape. The said strip M has a rear edge portion $m$ which is bent outwardly and away from the car body to receive behind it the flange N of the weather strip on the rear edge of the door. Screws O hold the flat inner portion $o$ of the weather strip M in place on the side of the car. With this construction the weather strip M is entirely concealed and is inside of the door when the latter is closed. But in either Fig. 3 or in Fig. 6 the stationary strip has an engaging portion (N or M) formed by bending the sheet metal first outward and away from the car and then toward the car.

In Fig. 5 the forward edge of the door A is provided with a tongue P which engages a groove $p$ in the post Q on the side of the car body. In this way the front edge of the door is tightly closed and made weather tight.

In Fig. 7 the lower edge of the doorway in the body of the car is provided with a threshold weather strip R provided with an outer flange $r$ for engaging the channel bar I, previously described. It will be seen that the portion $r$ occupies a position immediately above the lower flange $i$ of said channel bar, whereby a tight joint is provided by what are practically two coöperating guides which slide one upon the other and which are mounted respectively upon the car body and the lower edge of the door. The brackets S are secured to the side of the car body, immediately below the lower edge of the door and are provided with upwardly extending portions $s$ which engage the strip T on the outer surface of the door, whereby coöperating guides are provided to hold the door in place.

It will also be seen that the car body is provided with a strip U extending along the lower portion thereof, in a plane which includes the tops of the portions $s$ of the guide brackets. The lower portion of the flange $g$, or of the flange N, slides on this strip U when the door is opened and closed.

From the foregoing it will be seen that the door is practically weather tight at top and bottom thereof, and also at the front and rear edges. In this way water and dust and dirt, and even wind, are prevented from entering the car, thereby adapting the latter for certain uses which would not be practicable with the ordinary or non-weather tight door.

I do not limit myself to the exact construction shown and described.

What I claim as my invention is:—

1. A car door construction comprising interlocking weather strips on the car and rear edge of the door, means for securing the door strip in position, and bolts having eyes for engaging said means, said bolts being disposed in a plane between the door and car, each bolt extending through the door strip and having a nut to hold this strip against distortion when the door is closed, said nuts extending substantially with the path of relative movement of the car strip, and the axes of said nuts being parallel with the side of the car.

2. A car door construction comprising interlocking weather strips on the car and rear edge of the door, bars on the inner surface of the door, bolts extending through said door and bars, eyes clamped against said bars by said bolts, said eyes having threaded portions extending through the door strip, and nuts engaging said threaded portions to clamp said door strip against the ends of said bars.

3. A car door construction comprising interlocking sheet metal weather strips on the car and rear edge of the door, the stationary strip having a portion thereof secured flatwise against the outer side surface of the car, and having an engaging portion formed by bending the sheet-metal first outward and away from the car and then toward the car.

4. A car door construction comprising interlocking weather strips on the car and rear edge of the door, channel bars on the inner surface of the door, bolts extending through said door and bars, eyes clamped against said bars by said bolts, said eyes having threaded portions extending through the door strip, and nuts engaging said threaded portions to clamp said door strip against the ends of said bars, and a threshold strip formed with a jutting flange engaging in the channel of the lowest bar.

5. A car door construction comprising interlocking weather strips on the car and rear edge of the door, channel bars on the inner surface of the door, bolts extending through said door and bars, eyes clamped against said bars by said bolts, said eyes having threaded portions extending through the door strip, and nuts engaging said threaded portions to clamp said door strip against the ends of said bars, said eyes and the inner ends of the bolts occupying the channels of said bars, so that the bolts can pass the car strip, and the car strip having an attaching portion secured flatwise to the side of the car and spaced from the inner edges of said bars.

Signed by me at Sterling, Illinois, this 19 day of Feb. 1915.

PETER FRANTZ.

Witnesses:
MAURICE COPE DOW,
JOSEPH WILLIAM WENTSEL.

Copies of this patent may be obtained for five cents each, by addressing the "Commissioner of Patents, Washington, D. C."